W. T. MUNGER.
Reversible Latch.
No. 161,700.  Patented April 6, 1875.
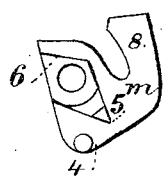
Fig. 3.
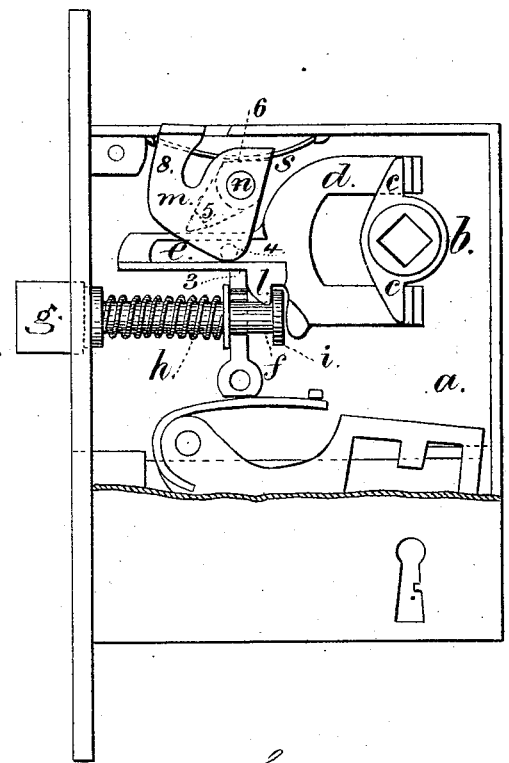
Fig. 1.
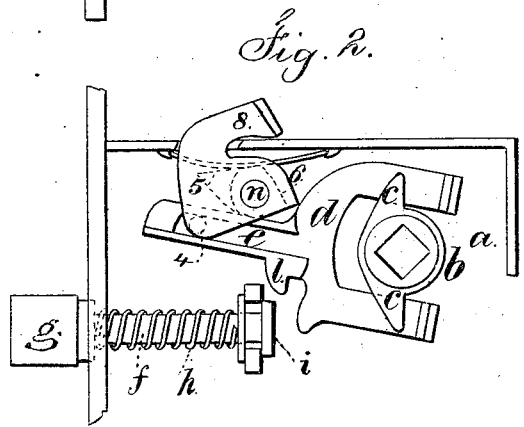
Fig. 2.
Witnesses,
Chas. H. Smith
Harold Serrell
Inventor
Wallace T. Munger
per Lemuel W. Serrell
atty
THE GRAPHIC CO. PHOTO-LITH. 39 & 41 PARK PLACE, N.Y.

UNITED STATES PATENT OFFICE.

WALLACE T. MUNGER, OF NEW BRITAIN, CONNECTICUT, ASSIGNOR TO P. & F. CORBIN, OF SAME PLACE.

IMPROVEMENT IN REVERSIBLE LATCHES.

Specification forming part of Letters Patent No. 161,700, dated April 6, 1875; application filed February 27, 1875.

CASE G.

*To all whom it may concern:*

Be it known that I, WALLACE T. MUNGER, of New Britain, in the county of Hartford and State of Connecticut, have invented an Improvement in Reversible Latches, of which the following is a specification:

Latches have been made with a horseshoe or sliding frame, against which the cams upon the spindle-hub act; and this frame has been connected to the latch by a notch or opening, and the frame has received a lateral or swinging motion to disconnect it from the latch sufficiently to allow the latter to be drawn forward and reversed.

My present invention is an improvement in the class of locks before mentioned; and consists in a sliding horseshoe with a projecting grooved bar, in combination with a tumbler-guide constructed to securely hold the sliding bar when the lock is in use, and to draw the bar and horseshoe aside sufficiently to disconnect them from the reversible latch. The aforesaid tumbler is made with an angular bearing for a spring, so that it is held in either of the positions to which it is turned.

In the drawing, Figure 1 is an elevation of the lock, with the cap-plate removed. Fig. 2 is a diagram, showing the position of the parts when the latch is in position for reversal; and Fig. 3 is a back elevation of the tumbler-guide.

The lock-case $a$ and its cap-plate are of usual construction; and the hub $b$, cams $c$, and horseshoe or frame $d$ are also of ordinary character, with the exception that there is a grooved bar, $e$, extending out horizontally from the horseshoe, and resting against the stop 3, which stop 3 also forms one of the studs, between which the shank $f$ of the latch $g$ slides. This shank $f$ is surrounded by a spring, $h$, that acts to project the latch, and there is a head, $i$, that is received into a notch at the lower edge of the bar $e$ behind the talon $l$, so that when the parts are in the position shown in Fig. 1 the latch, horseshoe, and bar move all together, and are kept from separating by the tumbler-guide $m$. This tumbler-guide $m$ is upon a stud, $n$, and it is provided with a curved arm, 8, that passes out through a mortise in the rim of the lock-case at the top. It also has a stud, 4, entering the groove in the bar $e$, and a guide-stud, 5, that is contiguous to the upper edge of this bar $e$, so that the bar $e$ is sustained in its position, but is free to slide back and forth with the latch. The arm 8 allows the tumbler-guide to be moved from outside the case.

The angular bearing 6 upon the tumbler-guide $m$ is pressed upon by the spring $s$, and thereby the tumbler is held in position when the lock is in use, so that there is no risk of the parts becoming misplaced by the concussion of the door or the latch.

When this tumbler-guide is moved to the position shown in Fig. 2 the spring $s$ also holds the same, and the stud 4 has moved the bar $e$ so as to unlatch the head $i$ of the spring-latch from behind the talon $l$, so that the latch is projected sufficiently to be partially revolved to reverse the position of the bevel.

This construction of reversible latch is simple, strong, and not liable to injury or wear; and the parts resume their normal position, after reversing the latch, by simply pushing the latch back to its place.

I claim as my invention—

The tubular guide $m$, with an angular bearing for the spring $s$, a curved arm, 8, and studs 4 and 5, in combination with the grooved bar $e$ of the horseshoe, the talon $l$, and reversible latch, whereby the sliding bar is securely held in position when in use, as set forth.

Signed by me this 12th day of February, A. D. 1875.

W. T. MUNGER.

Witnesses:
 CHARLES PECK,
 E. L. PRIOR.